June 15, 1948.  E. M. HALBLEIB  2,443,241
ENDLESS TREAD TRACTOR SHOVEL
Filed Sept. 24, 1946  2 Sheets-Sheet 1
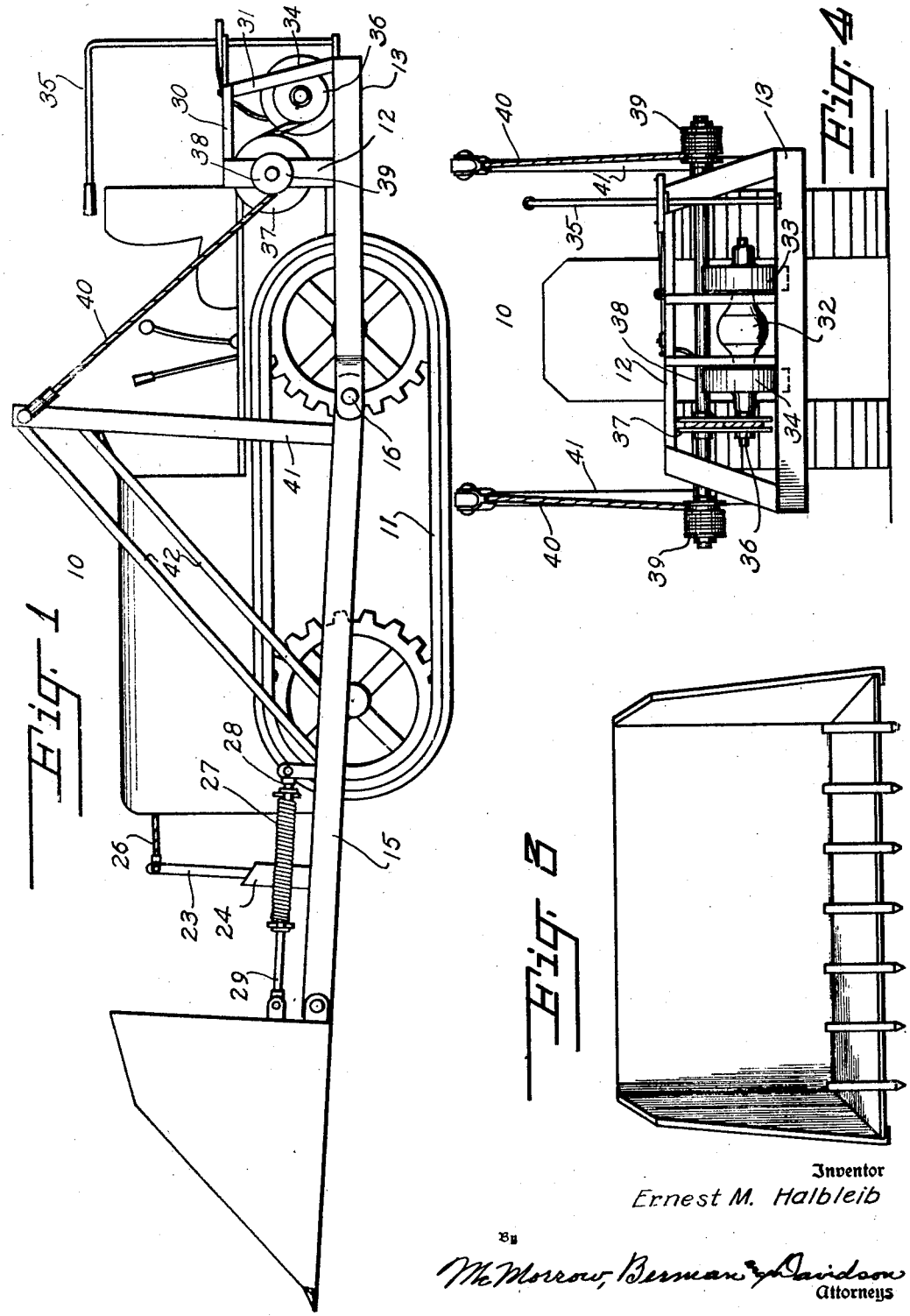
Inventor
Ernest M. Halbleib
By
McMorrow, Berman & Davidson
Attorneys

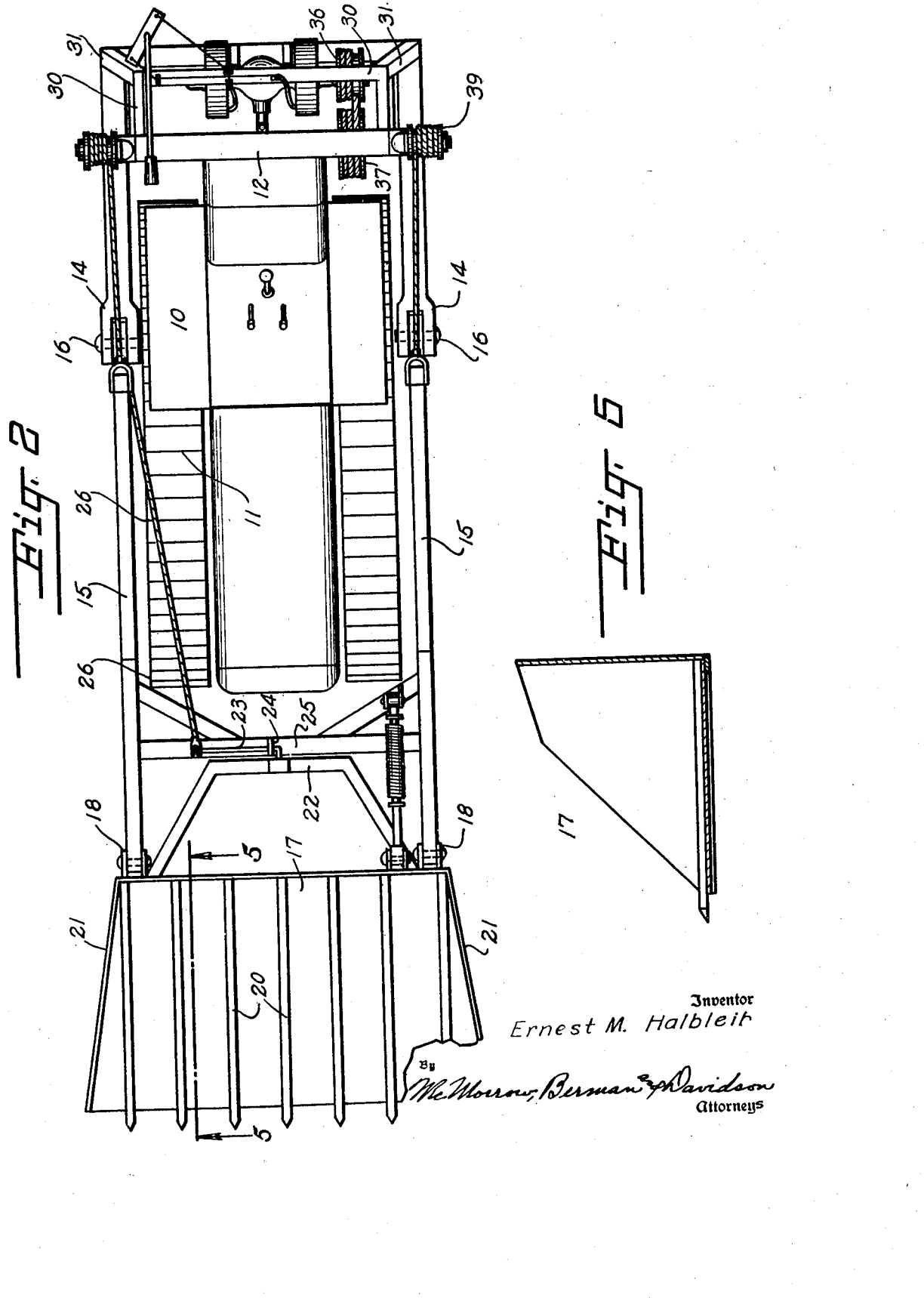

UNITED STATES PATENT OFFICE 2,443,241

ENDLESS TREAD TRACTOR SHOVEL

Ernest M. Halbleib, McNabb, Ill.

Application September 24, 1946, Serial No. 698,985

3 Claims. (Cl. 214—140)

The present invention relates to powered shovels and is more particularly concerned with a shovel mounted on a tractor with Caterpillar or endless treads.

The primary object of the invention is to provide a device of the character referred to which is especially adapted to move or load manure.

Another object of the invention is to provide a device of the character referred to which will load manure on a manure spreader from the ground where it has been dropped by animals or piled by laborers.

A further object of the invention is to provide a device of the character referred to of simpler and more compact construction than prior devices.

With the foregoing and other objects and advantages in view the invention consists of the novel construction and arrangement of parts hereinafter described and claimed.

In the accompanying drawings illustrating the invention,

Figure 1 is a side elevation of the machine.

Figure 2 is a top plan view thereof.

Figure 3 is a front elevation of the shovel.

Figure 4 is a rear elevation of the machine.

Figure 5 is a vertical longitudinal section of the shovel on line 5—5 of Figure 2.

Like numerals, as used in the description and drawings, designate the same parts of construction.

10 is a powered tractor of conventional type which is mounted on Caterpillar treads 11.

Secured to the rear of the tractor body is a transversely disposed yoke 12 whose depending, parallel arms provide support for an horizontally disposed frame 13, consisting of an end bar and two forwardly projecting, parallel side bars. These side bars are bifurcated on the front ends, as at 14, for reception of the rear ends of parallel shovel holding arms 15 which are mounted on pivot bolts 16 to allow a swivel movement of the arms in a vertical plane.

The shovel 17 is pivotally attached to the forward ends of said arms by means of brackets 18 and bolts. It is constructed with an horizontal bottom 19 provided with a plurality of spaced, parallel teeth 20, a vertical back and flared sides 21.

On the rear of the shovel is a yoke 22 and centrally thereof is a crank lever 23 designed to tilt and dump the shovel. The lever is mounted in a standard 24 on a transverse truss 25 between the arms, 15 and is operated by cable 26 to a lever near the driver's seat. A coiled spring 27 serves to make said shovel yieldable and it is connected to a standard on shovel arm 15 by means of a pivoted bolt 28 and to a bracket on the back of the shovel by another pivoted bolt 29. The spring 27 returns shovel 17 to loading position after dumping.

Projecting rearwardly from the yoke 12 is another yoke 30 which is supported by standards 31. Suspended from this yoke is the housing 32 for a divided shaft powered by the tractor engine. On one end of the shaft is mounted a controlled brake 33 and a controlled clutch 34 is mounted on the other end. The control lever 35 for operating said elements is provided with a crank arm and the handle thereof is near the driver's seat.

Mounted on said shaft is a cable drum 36 with a deep one-strand groove which operates a cable to a second cable drum 37, with a similar groove, mounted on a rotatable shaft 38 which is journaled in the depending branches of yoke 12. This shaft projects at each end beyond the yoke and mounted on these projecting ends to rotate therewith are dual cable drums 39 carrying cables 40 which are pivotally attached at the free ends to the upper ends of standards 41 mounted perpendicularly on the rear ends of the shovel arms 15. Brace bars 42 extend from said standards to the foreparts of the arms.

In operation the lever is operated to throw in the clutch and raise or lower the shovel. By use of the brake the upward and downward movement thereof can be controlled. When the shovel is lowered to contact the ground the Caterpillar is moved forward and the shovel thereby driven into the bottom of the manure pile. With the shovel filled, the motion of shaft 38 is reversed to raise the shovel. The operator then dumps the load by pulling on cable 26 and tilting the shovel. The shovel load may be dumped in a transport or it may be carried to another point by the Caterpillar.

As different embodiments may be made of this inventive concept and modifications may be made in the embodiment hereinbefore shown and described, it will be understood that the matter herein is to be interpreted as illustrative merely and not in a limiting sense.

What I claim is:

1. In a manure loader adapted to be mounted on a Caterpillar tractor, a frame dependingly carried by said tractor, a pair of longitudinally-extending shovel-holding arms pivotally secured at one end to the outer end of said frame, a shovel pivotally secured to the other ends of said arms, a yoke disposed rearwardly of said shovel and secured to the latter, a truss arranged transversely with respect to said shovel arms and secured to the latter, a standard on said truss, a crank lever mounted in said standard and operatively connected to said yoke for tilting said shovel, resilient means operatively connected to said shovel and said shovel arms for returning said shovel to its normal position upon release of the load, and means for raising and lowering said shovel.

2. In a manure loader adapted to be mounted on a Caterpillar tractor, a frame dependingly carried by said tractor, a pair of longitudinally-extending shovel-holding arms pivotally secured at one end to the outer ends of said frame, a shovel pivotally secured to the other ends of said arms, a yoke disposed rearwardly of said shovel and secured to the latter, a truss arranged transversely with respect to said shovel arms and secured to the latter, a standard on said truss, a crank lever mounted in said standard and operatively connected to said yoke for tilting said shovel, resilient means operatively connected to said shovel and said shovel arms for returning said shovel to its normal position upon release of its load, means on said frame for actuating said crank lever, and means for raising and lowering said shovel.

3. In a manure loader adapted to be mounted on a Caterpillar tractor, a frame carried by said tractor, a pair of longitudinally-extending shovel-holding arms pivotally secured at one end to the outer end of said frame, a shovel pivotally secured to the other ends of said arms, a yoke disposed rearwardly of said shovel and secured to the latter, a truss arranged transversely with respect to said shovel arms and secured to the latter, a standard on said truss, a crank lever mounted in said standard, means operatively connected to said yoke for tilting said shovel, resilient means embodying a coil spring having one end connected to said shovel and the other end connected to one of said arms for returning said shovel to its normal position upon release of its load, and means for raising and lowering said shovel.

ERNEST M. HALBLEIB.

REFERENCES CITED

The following references are of record in the file of this patent:

UNITED STATES PATENTS

| Number | Name | Date |
|---|---|---|
| 1,742,494 | Clausen | Jan. 7, 1930 |
| 2,323,404 | Kuchar | July 6, 1943 |
| 2,323,434 | Williams | July 6, 1943 |
| 2,377,495 | Hofmeister | June 5, 1945 |
| 2,402,908 | Neville et al. | June 25, 1946 |